May 28, 1940.  H. J. HORN  2,202,490

METHOD OF MAKING VEHICLE WHEELS

Filed Nov. 6, 1937

INVENTOR.
HARRY J. HORN
BY Carroll R. Taber
ATTORNEY.

Patented May 28, 1940

2,202,490

UNITED STATES PATENT OFFICE 2,202,490

METHOD OF MAKING VEHICLE WHEELS

Harry J. Horn, Lansing, Mich., assignor to Motor Wheel Corporation, Lansing, Mich., a corporation of Michigan Application November 6, 1937, Serial No. 173,056

1 Claim. (Cl. 29—159.03)

This invention relates to vehicle wheels, and more particularly to stamped metal wheels of the spoke type.

The principal object of the invention is the provision of a novel method of producing a closed spoke type stamped metal wheel body from a single blank of metal. In general this object is attained by first forming a substantially circular blank having a serpentine periphery, pressing U-shaped spoke formations in the blank inwardly of its periphery, and thereafter bending the metal at the periphery of the blank to close the open side of the U-shaped spoke formations.

In the drawing—

Figure 1:
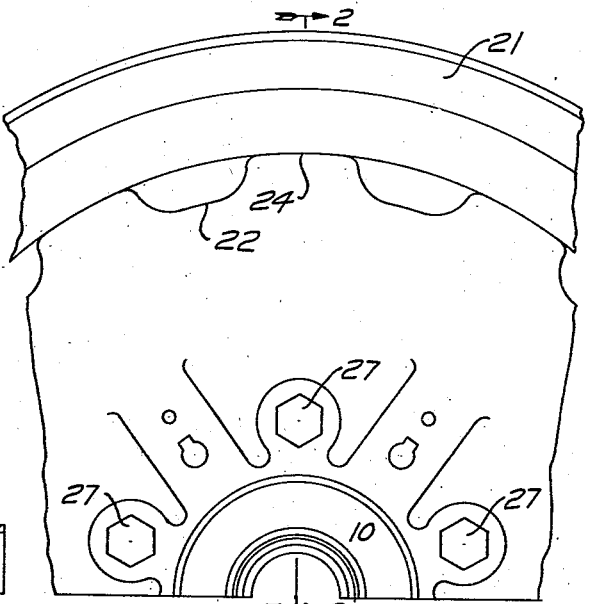
Figure 1 is a fragmentary front elevational view of a wheel produced in accordance with the present invention.
Figure 2:
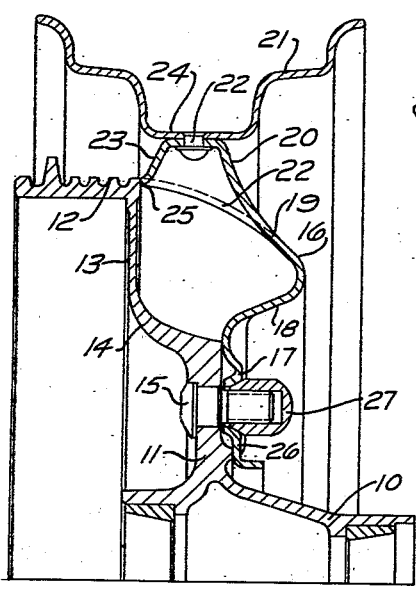
Figure 2 is a cross-sectional view of the wheel shown in Figure 1 taken on substantially the line 2—2 of Figure 1.

The wheel shown in Figures 1 and 2 comprises a hub 10 having a radially extending flange 11 to which is secured the brake drum 12. The brake drum has a radially extending web 13, the central portion of which merges into the radial flange 11 of the hub by a curved portion 14. The hub 10 and brake drum 12 are preferably cast in one piece but may be made separately and secured by welding, riveting or the like. At spaced intervals about the axis of the hub 10 is a plurality of stud bolts 15 which form a portion of the securing means for a wheel body 16.

The wheel body member 16 comprises a nave portion consisting of a central bolting-on flange 17 which extends generally radially thereof, and a portion 18 which extends both radially and axially outwardly from the outer periphery of the bolting-on flange 17. Extending axially inwardly and radially outwardly from the portion 18 is a spoked portion 19 which is provided with a plurality of spokes 20 secured to a conventional drop center type rim 21 by a plurality of rivets 22.

Figure 9:
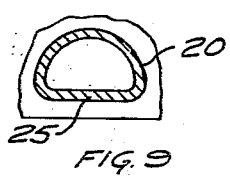
Figure 9 is a cross-sectional view of one of the spokes of the wheel body taken on substantially the line 9—9 of Figure 8.

The spoke portion 19 consists of a plurality of spokes 20. Each spoke is of generally tubular form as shown in Figure 9 including an end closure 24 and a rear wall 23. The spokes 20 blend into the nave portion 18 and between the bases of the spokes the nave is depressed axially inwardly to form valley portions 22. The radially inner extremities of the backs 23 are arranged to constitute an annular continuation with the axially inner extremities of the valleys 22 and both these extremities are engaged by the web 13 of the brake drum. Thus, when the wheel body is secured to the hub by the conventional stud bolts 15 and nuts 27, the wheel body is reinforced by the brake drum and the brake drum effectively closes the spokes 20 of the wheel body so as to exclude foreign matter therefrom.

Figure 4:
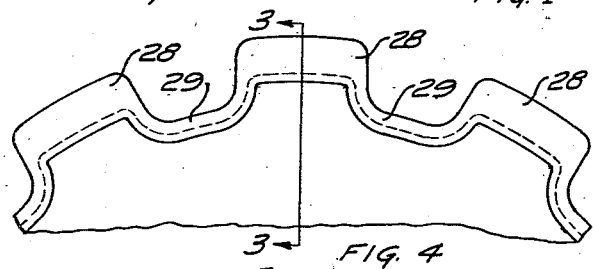
Figure 4 is a fragmentary rear elevational view of the blank shown in Figure 3.
Figure 3:
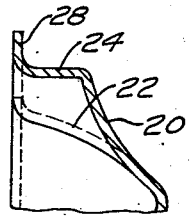
Figure 3 is a fragmentary cross-sectional view of the wheel body after the preliminary forming operation taken on substantially the line 3—3 of Figure 4.

In producing the wheel body shown in Figures 1 and 2, the first step is the formation of a generally circular blank having a serpentine periphery. The next step is to press the metal of the blank in zones located radially inwardly of its periphery to produce spoke formations 20 of generally U-shaped channel section closed at their outer extremities by the end portions 24. The unpressed periphery of the blank forms in undulating radially extending continuous peripheral flange indicated at 28 and 29 (Figures 3 and 4).

Preferably the first two steps just described are produced by a single continuous operation known as a blank and drawing operation. In other words, the blank is cut to the desired serpentine shape and in a single continuous operation the blank is then deformed to the configuration shown in Figures 3 and 4. Usually a shearing operation is necessary following the blank and drawing operation in order to produce the desired configuration of the undulating flange 28 and 29.

Figure 6:
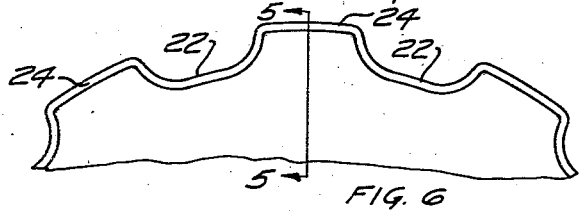
Figure 6 is a fragmentary rear elevational view of the partially formed wheel body shown in Figure 5.
Figure 5:
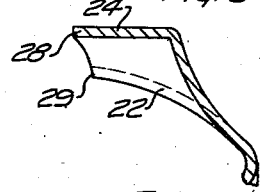
Figure 5 is a fragmentary cross-sectional view taken on substantially the line 5—5 of Figure 6 and shows the second step in the process of making the wheel body.
Figure 8:
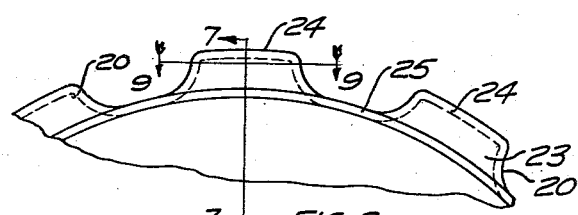
Figure 8 is a fragmentary rear elevational view of the completed wheel body shown in Figure 7.
Figure 7:
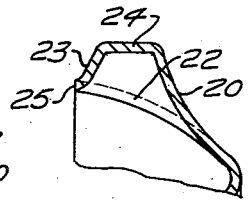
Figure 7 is a fragmentary cross-sectional view taken on substantially the line 7—7 of Figure 8, showing a portion of the completed wheel body.

The next operation consists in pressing the continuous annular flange 28 and 29 axially inwardly to produce the configuration shown in Figures 5 and 6. Thereafter, the portions 28, constituting an integral extension of the spoke ends 24, are bent radially and axially inwardly to the position shown in Figures 7 and 8. By this forming operation, the open sides of the channel shaped spoke sections are provided with closures 23. The radially inner extremities of the closures 23 constitute effective continuations of the axially inner extremities of the flange portions 29, thus producing a continuous annulus 25 about the base of the spokes. The annulus 25 is then preferably machined to provide for contact throughout its circumference with the web 13 of the brake drum when the wheel body is mounted as shown in Figures 1 and 2.

From the foregoing it will be apparent that the invention is susceptible to many variations, and consequently I desire that the same be limited only by the scope of the appended claim.

I claim:

The method of manufacturing a one piece pressed metal wheel body having seamless tubular spokes about its periphery which comprises providing a generally circular blank of sheet metal, pressing the blank in a zone inwardly of its periphery to form open backed spoke portions while leaving a continuous radial flange about the entire periphery of the blank, said spoke portions having axially extending end and side walls and being of a length such that the diameter of the blank at the outer ends of the spokes is substantially the same as the inner diameter of a rim to which the spokes are to be connected, thereafter pressing said flange axially inwardly to form a continuous axial extension of said end and side walls, and finally pressing and flowing said extension radially and axially inwardly to close the open backs of said spoke portions.

HARRY J. HORN.